(12) United States Patent
Paulus et al.

(10) Patent No.: US 6,421,409 B1
(45) Date of Patent: Jul. 16, 2002

(54) ULTRA-HIGH RESOLUTION COMPUTED TOMOGRAPHY IMAGING

(75) Inventors: Michael J. Paulus; Hamed Sari-Sarraf, both of Knoxville; Kenneth William Tobin, Jr., Harriman; Shaun S. Gleason; Clarence E. Thomas, Jr., both of Knoxville, all of TN (US)

(73) Assignee: UT-Battelle LLC, Oak Ridge, TN (US)

(*) Notice: Subject to any disclaimer, the term of this patent is extended or adjusted under 35 U.S.C. 154(b) by 0 days.

(21) Appl. No.: 09/496,879

(22) Filed: Feb. 2, 2000

(51) Int. Cl.$^7$ ................................................ A61B 6/03
(52) U.S. Cl. .......................................... 378/4; 378/901
(58) Field of Search ............................ 378/4, 10, 901

(56) References Cited

U.S. PATENT DOCUMENTS 5,566,341 A * 10/1996 Roberson et al. ............. 712/15
5,740,224 A * 4/1998 Müller et al. .................. 378/11

OTHER PUBLICATIONS

Devoti, R. et al., "A Synchrotron Radiation Microprobe for X–ray Fluorescence and Microtomography at ELETTRA. Focusing with Bent Cyrstals, " Nuclear Instruments & Methods in Physics Research, B54, pp. 424–428, Amsterdam, NL (Mar. 2, 1991).

Machin, K. et al., "Cone–beam X–ray Microtomography of Small Specimens, " 2362 Physics in Medicine & Biology 39, No. 10, pp. 1639–1667, Bristol, G.B. (1994).

Weitkamp, T. et al., "An Imaging and Microtomography Facility at the ESRF Beamline ID 22, " Proceedings of the 1999 SPIE Conference on Developments in X–ray Tomography II, Denver, CO pp. 311–317 (Jul. 1999).

McNulty, J., et al., "Design and Performance of the 2–ID–B Scanning X–ray Microscope, " Proceedings of the 1999 SPIE Conference on X–ray Microfocusing: Applications and Techniques, San Diego, CA, pp. 67–74 (Jul. 1998).

* cited by examiner

*Primary Examiner*—David V. Bruce
(74) *Attorney, Agent, or Firm*—Akerman Senterfitt

(57) ABSTRACT

A method for ultra-high resolution computed tomography imaging, comprising the steps of: focusing a high energy particle beam, for example x-rays or gamma-rays, onto a target object; acquiring a 2-dimensional projection data set representative of the target object; generating a corrected projection data set by applying a deconvolution algorithm, having an experimentally determined a transfer function, to the 2-dimensional data set; storing the corrected projection data set; incrementally rotating the target object through an angle of approximately 180°, and after each the incremental rotation, repeating the radiating, acquiring, generating and storing steps; and, after the rotating step, applying a cone-beam algorithm, for example a modified tomographic reconstruction algorithm, to the corrected projection data sets to generate a 3-dimensional image. The size of the spot focus of the beam is reduced to not greater than approximately 1 micron, and even to not greater than approximately 0.5 microns.

9 Claims, 2 Drawing Sheets

ULTRA-HIGH RESOLUTION COMPUTED TOMOGRAPHY IMAGING

STATEMENT REGARDING FEDERALLY SPONSORED RESEARCH AND DEVELOPMENT

This invention was made with government support under contract DE-AC05-96OR22464, awarded by the United States Department of Energy to Lockheed Martin Energy Research Corporation, and the United States Government has certain rights in this invention.

CROSS-REFERENCE TO RELATED APPLICATION

Not Applicable

BACKGROUND OF THE INVENTION

1. Field of the Invention

This invention relates generally to the field of computed tomography imaging and in particular, to computed tomography imaging of packaged integrated circuits utilizing a very small x-ray or gamma-ray source, a rotating sample carrier or stage, a large-area detector array, a deconvolution algorithm, and optics including a Fresnel zone plate.

2. Description of the Related Art

As integrated circuits become larger and more complex, the integrated package necessarily becomes larger and more complex. An important source of integrated circuit failure stems from flaws in the packaging process. Virtually all methods for inspecting the bonds in a packaged integrated circuit require destruction of the package and the use of a high-magnification microscope or a scanning electron microscope. The integrated circuit industry is very interested in the development of a non-destructive inspection system. Computed tomography techniques can produce image "slices" of an object without destroying the object. To date, however, computed tomography approaches have been unable to achieve the required spatial resolution to inspect packaged devices for small cracks in the bonds and in the interconnections. There is a long-felt need for novel x-ray or gamma ray focusing techniques and image enhancement techniques to obtain the required resolution in a computed tomographic imaging system.

SUMMARY OF THE INVENTION

The concept proposed here employs novel x-ray or gamma ray focusing techniques and image enhancement techniques to obtain the required resolution in a tomographic imaging system. While each individual element of a presently preferred embodiment has been applied elsewhere, the combination and interaction of these elements is unique and provides the enhanced resolution not available in the prior art.

An ultra-high resolution computed X-ray or gamma-ray computed tomography system in accordance with the inventive arrangements can be used for inspecting packaged integrated circuits with the required spatial resolution needed to inspect packaged devices for small cracks in the bonds and in the interconnections. In the presently preferred embodiment, the method utilizes, and the system comprises, a sub-micron x-ray or gamma ray source, a large-area detector array and a rotating sample stage. The source is positioned very near the object under test and the large-area detector is positioned some distance from the object under test. The detector array can comprise either an array of charge-coupled device (CCD) detectors coupled to a phosphor screen or an image intensifier screen. In either case, the object under test is illuminated by a cone beam of x-rays or gamma rays which serves to magnify the image projected onto the large area detector array. The magnification permits the use of relatively large detector elements, on the order of approximately 10 microns×10 microns, to image micron-scale features. The system resolution is then limited by the size of the radiation source. Several approaches can be employed in accordance with the inventive arrangements to minimize the radiation source size. A first approach is using a micro-focal x-ray tube to obtain a source size of 10 microns or less. Focusing optics such as a Fresnel zone plate can then be used to further reduce the effective source size to 1 micron or less. Alternately, a second approach is using a small high activity gamma ray source, on the order of several microns, can be used in conjunction with focusing optics. With either approach, the acquired image is convolved with the ideal image in the detected image. The effective source size can be further reduced using algorithms to separate the contribution of the source geometry from the acquired image.

A method for ultra-high resolution computed tomography imaging, in accordance with the inventive arrangements, comprises the steps of: focusing a high energy particle beam onto a target object; acquiring a 2-dimensional projection data set representative of the target object; generating a corrected projection data set by applying a deconvolution algorithm to the 2-dimensional data set; storing the corrected projection data set; incrementally rotating the target object through an angle of approximately 180°, and after each the incremental rotation, repeating the radiating, acquiring, generating and storing steps; and, after the rotating step, applying a cone-beam algorithm to the corrected projection data sets to generate a 3-dimensional image.

The method can comprise the step of radiating the target object with x-rays or gamma rays.

The method can comprise the step of focusing the beam with an optical member, for example a Fresnel zone plate.

The spot focus of the beam can be reduced to a size not greater than approximately 1 micron, or even to a size not greater than approximately 0.5 microns.

The method can comprise the step of applying a modified tomographic reconstruction algorithm to the corrected projection data sets.

The method can further comprise the step of experimentally determining a transfer function for the deconvolution algorithm.

The method can comprise the step of incrementally rotating the target object through a total of 180° plus the angle of the fan beam.

BRIEF DESCRIPTION OF THE DRAWINGS

There are shown in the drawings embodiments of the invention that are presently preferred, it being understood, however, that the invention is not limited to the precise arrangements and instrumentalities shown, wherein.

DETAILED DESCRIPTION OF THE INVENTION

The inventive arrangements are directed to providing higher resolution computed tomography imaging, and in particular to two key aspects of such imaging. Prior art x-ray tubes have effective source sizes on the order of 10 microns. Improved resolution requires much smaller sizes, for example sub-micron sizes. One key aspect is to minimize the effective spot size of the source used to illuminate the target object under test by improving spot focus. The other key aspect is to further reduce the effective spot size by using improved image processing techniques.

Figure 1:
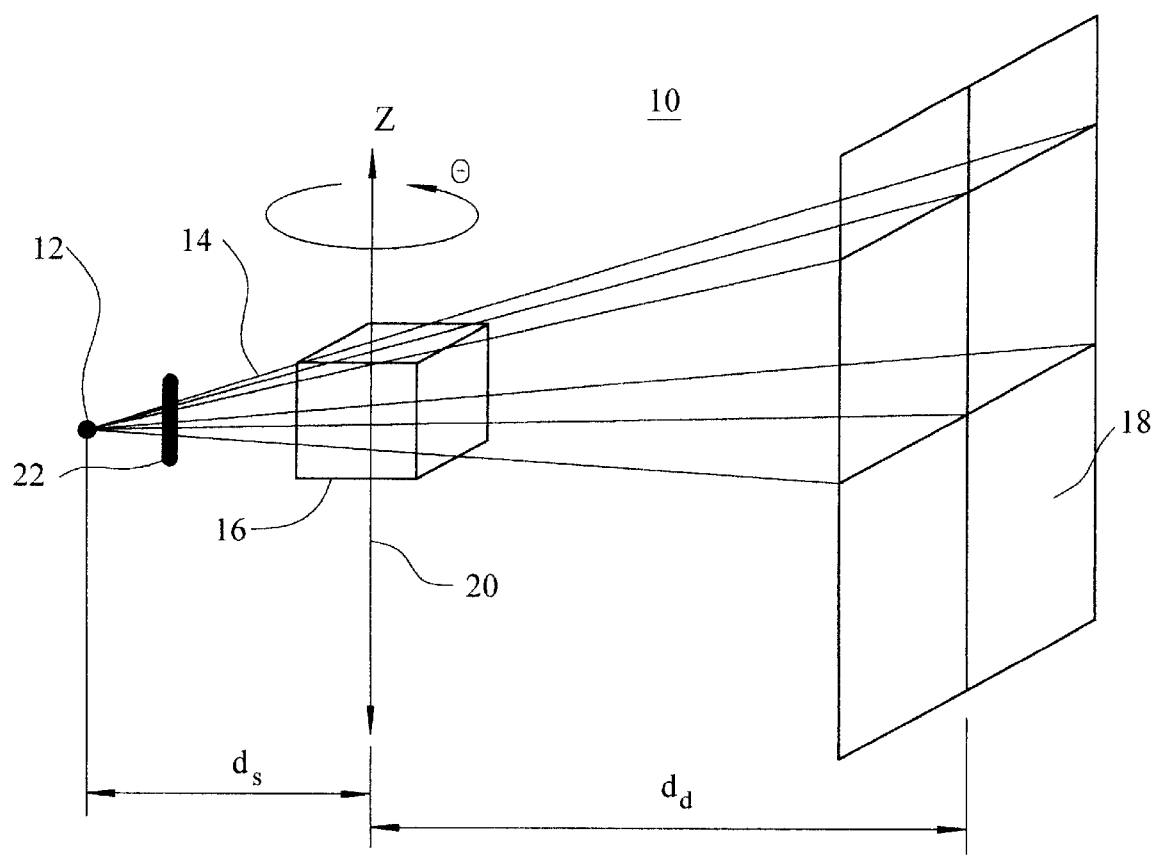
FIG. 1 is a schematic diagram useful for explaining computed tomographic inspection imaging in accordance with the inventive arrangements.
Figure 2:
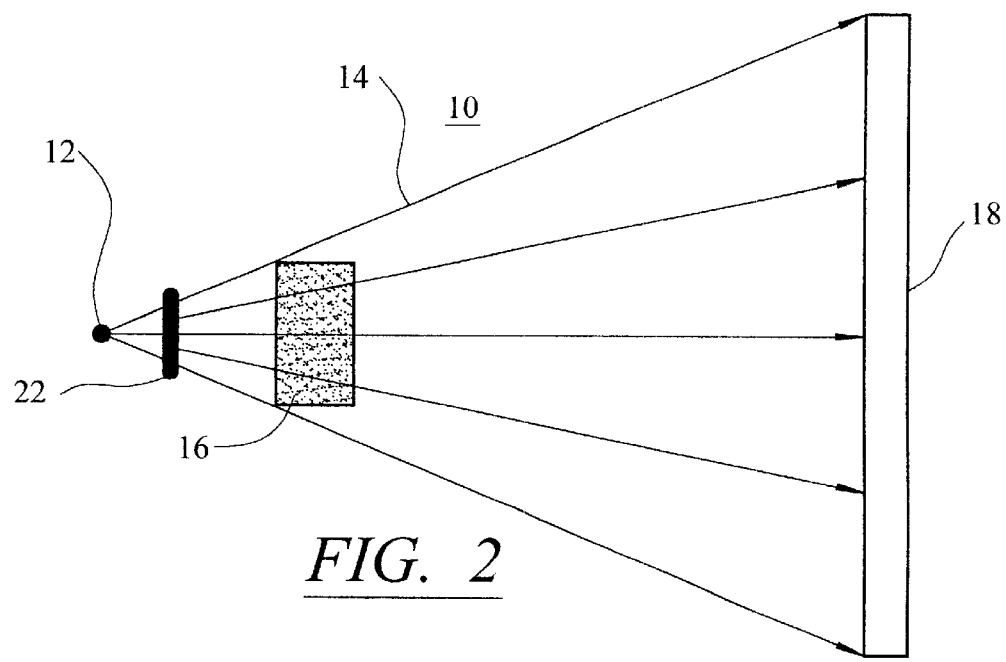
FIG. 2 is a schematic diagram useful for explaining computed tomographic inspection imaging in accordance with the inventive arrangements, from a different perspective, emphasizing a detector array.

In any computed tomography system the volumetric resolution is limited by the detector size, the source size, or the combined effects of both. When the source is spaced farther from the target object under test than is the detector, the resolution is typically limited by the detector size. Where the detector is spaced farther from the object than is the source, the source size limits the resolution. The latter case forms the context for best explaining the inventive arrangements and is illustrated in FIGS. 1 and 2.

The tomography system 10 comprises a source 12 of x-rays or gamma rays, for example an x-ray tube. The x-ray or gamma ray radiation 14 is used to inspect a target 16, which can be an object volume or a sub-volume within an object. The x-rays or gama-rays 14 are diffracted by the target 14 and impact a detector 16 in a pattern which is indicative of one or more characteristics of the target object. The target object is rotated, usually through at least 180°, in order to enable a complete picture to be generated. The rotating means is 20 is represented by the axis of rotation z, and the arc of rotation is represented by the circular arrow and angle θ. The pattern can be processed to form an image, for example a layer of connections in the interior of an integrated circuit. The distance from the target 16 to the source 12 is denoted $d_s$ and the distance from the target 16 to the detector 18 is denoted $d_d$. The distance $d_s$ is less than the distance $d_d$ in the illustrated embodiment, meaning that the spot focus size is the resolution determining factor.

With respect to focusing, the effective size of the source can be reduced by the use of one or more focusing optics 22, such as Fresnel zone plates. Fresnel zone plates have been used previously with soft x-rays, that is, low-energy x-rays on the order of 8 keV to 20 keV. The plates typically consist of concentric circles of an absorbing material patterned on a transmitting substrate. Gold has a relatively large atomic number and thus has been frequently employed with soft x-rays. For higher energy x-rays or gamma rays, materials such as tungsten or lead are often preferred. It is expected that sufficiently thick absorbers, the thickness of which will depend on the energy of the high energy x-rays or gamma rays, can be patterned for efficient focusing. The eventual efficiency of Fresnel zone plates in this regard will be case specific and is difficult to predict in the abstract.

Once the effective size of the x-ray source has been minimized using focusing techniques, improved image processing can be applied to further reduce the effective spot size. For purposes of further explanation in connection with FIG. 2, it is assumed that the effective size of the source 12 is 0.5 microns. The detector 18 is embodied as a 30 cm detector bank of 30,000 10 μm×10 μm pixels, formed by 30 1024×1024 pixel charge coupled device (CCD) arrays. The CCD arrays are coupled to a phosphor screen optimized for selected x-ray or gamma-ray energy.

Detector 18 can also be formed by a photo diode array, a scintillator array, a photo multiplier tube array or a cadmium zinc telluride semiconductor array, in a strip or pixelated configuration. The source 12 can also be a synchrotron x-ray source.

The detected image can be treated as a 2-dimensional convolution of the ideal image with a transfer function due to the finite (non-zero) size of the source. The transfer function due to the finite source size can be experimentally determined, and thereafter, the blurring due to the source can be arithmetically removed using standard 2-dimensional image processing techniques. The deconvolution algorithm is applied to each projection in the tomographic data set. The corrected projections can then be reconstructed to form the 3-dimensional tomographic image using a modified tomographic reconstruction algorithm.

Figure 3:
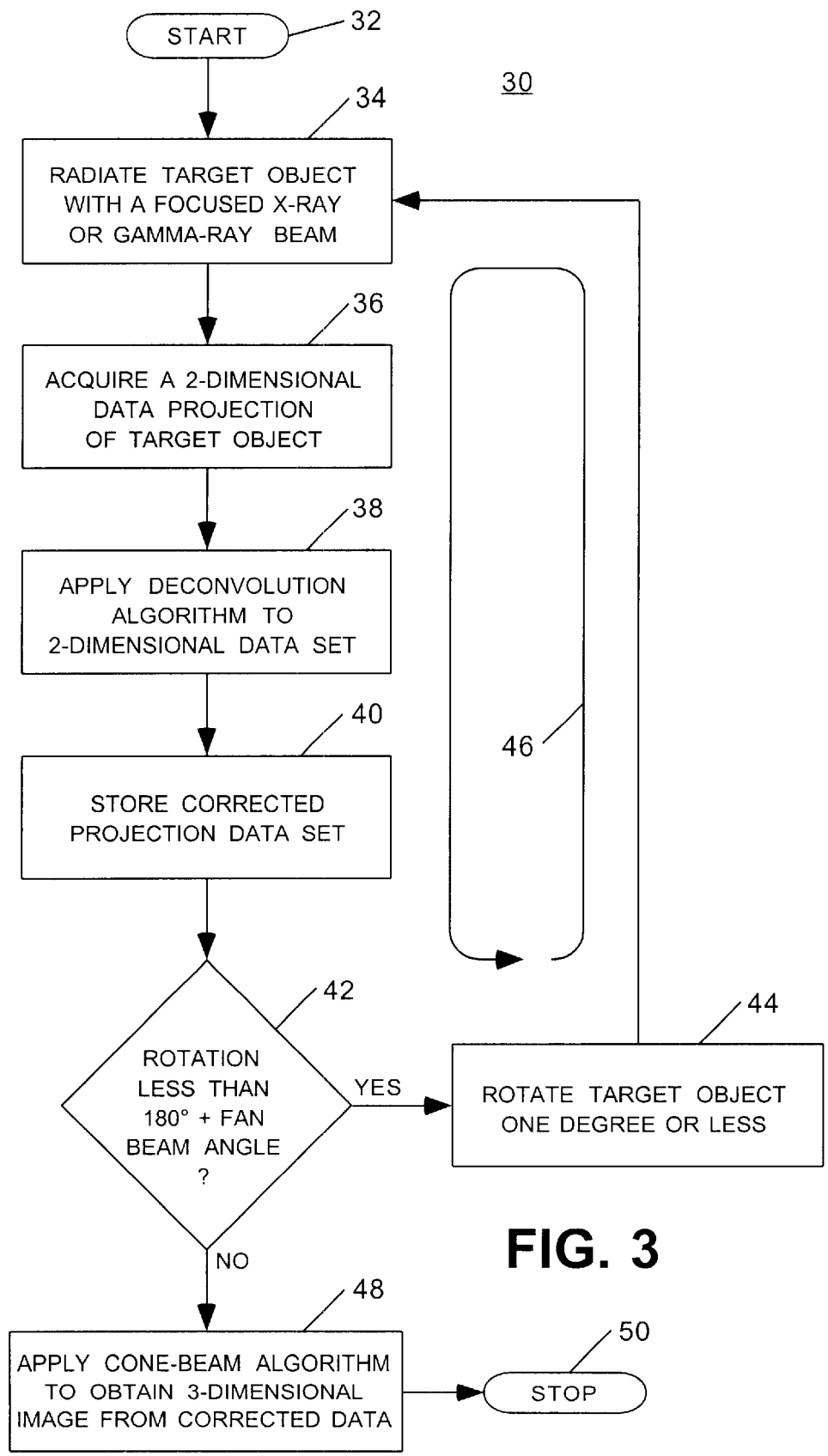
FIG. 3 is a flow chart useful for explaining an inspection and imaging process in accordance with the inventive arrangements.

A method for high resolution computed tomography in accordance with the inventive arrangements is illustrated by flow chart 30 in FIG. 3. The method assumes that the transfer function due to the finite source size has been experimentally determined.

The method starts at step 32. The target object is radiated with a focused x-ray or gamma-ray beam in accordance with step 34. The focus beam is preferably less than 1 micron in size, for example 0.5 microns. A 2-dimensional data projection of the target object is acquired in accordance with step 36. A convolution algorithm, with the experimentally determined transfer function, is applied to the 2-dimensional data set in accordance with step 38. The corrected projection data set is stored in accordance with step 40.

The target object must be rotated a total of 180° plus the angle of the fan beam. Accordingly, decision step 42 asks whether the rotation is less than 180° plus the angle of the fan beam. If the answer is yes, the target object is rotated, preferably by one degree or less, in accordance with step 44. The method returns to step 34, and the loop 46 continues until the rotation is not less than 180° plus the angle of the fan beam. When the target object has been fully rotated, a cone-beam algorithm is applied to obtain a 3-dimensional image from the corrected data sets in accordance with step 48. The algorithm is preferably a modified tomographic reconstruction algorithm. The method ends at step 50.

Hardware to acquire 3-dimensional tomographic images and the algorithms to reconstruct those images has already been developed at Oak Ridge National Laboratories which can achieve a spatial resolution of approximately 50 microns with prior art size sources. The inventive arrangements taught herein can be used to reduce the effective size of the x-ray or gamma-ray source in order to achieve ultra-high resolutions, on the order of 1 micron.

The inventive arrangements can be used for many purposes other than non-destructively screening integrated circuits for defects. Indeed, the inventive arrangements can be used for any application requiring non-destructive micronscale imaging. Examples of other kinds of devices and material which can be screened or otherwise inspected and imaged include, without limitation, other kinds of mechanical and electronic components and biological and geological samples.

What is claimed is:

1. A method for ultra-high resolution computed tomography imaging, comprising the steps of:

focusing a high energy particle beam onto a target object;

acquiring a 2-dimensional projection data set representative of said target object;

generating a corrected projection data set by applying a deconvolution algorithm to said 2-dimensional data set;

storing said corrected projection data set;

incrementally rotating said target object through an angle of approximately 180°, and after each said incremental rotation, repeating said radiating, acquiring, generating and storing steps; and, after said rotating step, applying a cone-beam algorithm to said corrected projection data sets to generate a 3-dimensional image.

2. The method of claim 1, comprising the step of radiating said target object with one of x-rays and gamma rays.

3. The method of claim 1, comprising the step of focusing said beam with an optical member.

4. The method of claim 1, comprising the step of focusing said beam with a Fresnel zone plate.

5. The method of claim 1, comprising the step of reducing a spot focus of said beam to a size not greater than approximately 1 micron.

6. The method of claim 1, comprising the step of reducing a spot focus of said beam to a size not greater than approximately 0.5 microns.

7. The method of claim 1, comprising the step of applying a modified tomographic reconstruction algorithm to said corrected projection data sets.

8. The method of claim 1, further comprising the step of experimentally determining a transfer function for said deconvolution algorithm.

9. The method of claim 1, comprising the step of incrementally rotating said target object through a total of 180° plus the angle of the fan beam.

* * * * *